Patented July 21, 1931

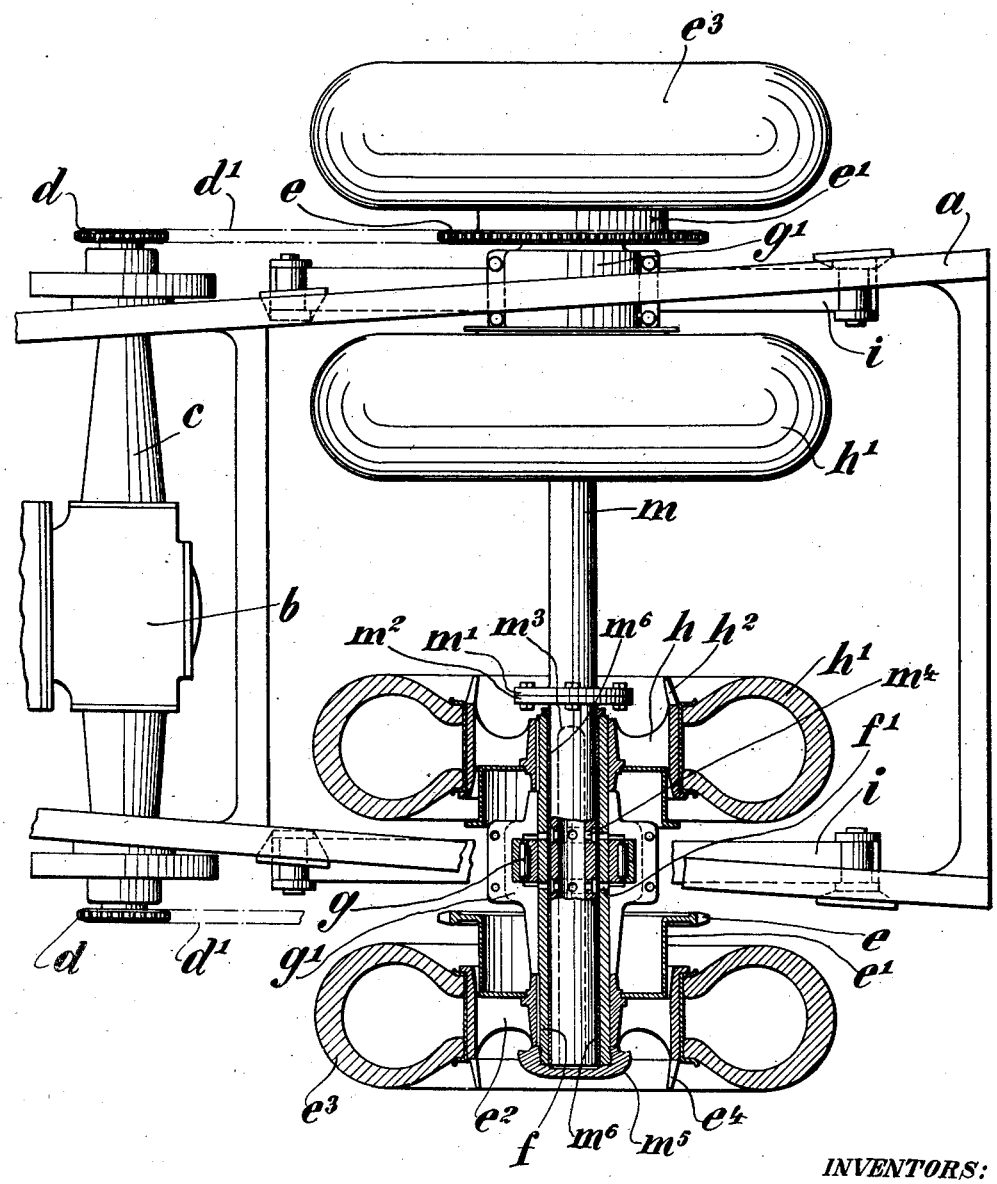

1,815,438

UNITED STATES PATENT OFFICE

LYMAN C. JOSEPHS, JR., AND ERVING R. GURNEY, OF ALLENTOWN, PENNSYLVANIA, ASSIGNORS TO INTERNATIONAL MOTOR COMPANY, OF NEW YORK, N. Y., A CORPORATION OF DELAWARE

CHAIN DRIVE FOR MOTOR VEHICLES

Application filed March 10, 1930. Serial No. 434,609.

The present invention relates to chain driven motor vehicles and embodies, more specifically, an improved drive for chain driven vehicles adapted to be used where dual tires are provided at either end of a driving axle.

More particularly, the invention is concerned with an improved wheel mounting and drive therefor in which the overall width of the vehicle need not be increased beyond the legal limit, at the same time providing a construction in which tires of considerable size can be used, thus improving the stability and operation of vehicles in which the present invention has been embodied.

A common difficulty experienced in vehicle design, particularly in commercial vehicle design, is that of maintaining the overall width within the prescribed limits of law. In the case of chain driven vehicles, where the driving chains upon either side of the frame require a definite space, the tires have necessarily been mounted outside of the chains. This materially limits the distance between spring centers and causes a very unstable condition of the load, resulting in great danger of overturning particularly where the vehicle is operated at high speeds.

In order that the advantages of a chain drive may be obtained without sacrificing the advantages of dual tires, and at the same time maintaining the overall width of the vehicle within the limits prescribed by law, the present invention has been designed and by means of the construction thereof, dual tires are effectively used without incurring the disadvantageous features heretofore existing in vehicles of this character.

An object of the invention, accordingly, is to provide a drive for motor vehicles by means of which a relatively great distance between spring centers may be maintained, at the same time, using dual tires upon either side of the axle.

A further object of the invention is to provide a chain drive for motor vehicles in which dual tires are employed, a relatively great distance between spring centers being preserved.

A further object of the invention is to provide a drive of the above character in which the parts are simple of construction and of great strength, the construction being such that the tires and wheels may be readily removed and replaced.

Further objects of the invention, not specifically enumerated above, will be apparent as it is described in greater detail in connection with the accompanying drawing, wherein the single figure is a plan view, partly broken away and in section, showing a drive constructed in accordance with the present invention.

Referring to the above drawing, the vehicle side frame members are shown at $a$ carrying a differential $b$ and jack shaft housing $c$. Sprockets $d$ are provided upon either side of the frame for driving chains $d'$, indicated in dot and dash lines. These chains engage driven sprockets $e$, mounted upon brake drums $e'$ which are preferably secured to the outer wheels $e^2$. The outer wheels carry tires $e^3$ and are secured to a tubular shaft $f$ which is journaled in a bearing $g$, carried by a split bearing box $g'$. The inner ends of the shafts $f$, upon opposite sides of the frame, have splined thereto inner wheels $h$ which carry tires $h'$. If desired, guides $e^4$ and $h^2$ are formed on the wheels to facilitate mounting the tires thereon, this being particularly desirable where tires of large size are used.

The split bearing boxes are secured to springs $i$ which are secured to the side frame members $a$ in the usual manner, the foregoing construction thus placing the springs between the pairs of wheels at either side of the frame. In this manner, the bearing $g$ carries the load and lubrication thereof is preferably effected by means of ports $f'$ in the tube $f$ through which lubricant may flow from the interior of the tube to the bearings $g$.

Within the tubular shafts $f$, a shaft $m$ is mounted, the central section thereof being formed with flanges $m'$ which are secured to flanges $m^2$ formed upon the outer sections. The outer sections are preferably hollow as indicated at $m^3$ in order to receive a lubricant and apertures $m^4$ permit the flow thereof to the apertures $f'$ and bearings $g$. A cap $m^5$ is threaded over the end of each tube $f$ to prevent the escape of lubricant, and bushings $m^6$ are provided as bearings for the stabilizing tube $m$.

It will thus be seen that the inner tires may be removed by removing the central section of the shaft $m$, this shaft serving as a stabilizer to keep the wheel sets from capsizing when rounding corners. Under normal forward motion there is no load on the bearings $m^6$ of the shaft $m$ and the shaft therefore merely rotates with the wheels.

From the foregoing description, it will thus be seen that the drive is taken from the driving sprockets $d$ and chains $d'$ to the driven sprockets $e$. From these sprockets the driving force is transmitted through the brake drums $e'$ and outer wheels $e^2$ to the hollow shafts $f$ and inner wheels $h$. The inner and outer wheels of each set are thus driven simultaneously and a relatively great distance between the spring centers is preserved to provide a more stable unit.

While the invention has been described with specific reference to the accompanying drawing, it is not to be limited, save as defined in the appended claim.

We claim as our invention:

A device of the character described comprising a vehicle frame having springs at either side thereof, a plurality of wheels, a journal box carried by each of the springs, a tubular shaft section journaled in each journal box, means for mounting a plurality of wheels on each shaft section, a driving sprocket on each shaft section, a stabilizing shaft journaled in the shaft sections and formed with an intermediate section mounted thereon to be removed from the cooperating sections without dismounting the last named sections, and means for driving the wheels through the sprockets.

This specification signed this 3rd day of March, A. D. 1930.

LYMAN C. JOSEPHS, Jr.
ERVING R. GURNEY.